March 17, 1936.  E. FALKENTHAL  2,034,334

PHOTOELECTRIC CELL

Filed July 29, 1931

INVENTOR
Erwin Falkenthal
BY
ATTORNEY

Patented Mar. 17, 1936

2,034,334

UNITED STATES PATENT OFFICE 2,034,334

PHOTOELECTRIC CELL

Erwin Falkenthal, Berlin-Dahlem, Germany

Application July 29, 1931, Serial No. 553,820
In Germany August 7, 1930

21 Claims. (Cl. 136—89)

My invention relates to novel constructions of photoelectric cells and methods of making and operating the same, and more specifically of photo-voltaic cells of the layer type which are highly responsive to light radiation, and which generate currents without the aid of an auxiliary source of current.

I have discovered that a photo-voltaic cell of this character may be obtained by proper construction and use of materials.

Accordingly, an object of my invention is to provide a photo-voltaic cell responsive to light and heat radiation.

A further object of my invention is to provide a photo-voltaic cell which is operative independently of an auxiliary source of current.

I have discovered that the efficiency of a photo-voltaic cell of the aforesaid character depends mainly on the production of active layers which are sufficiently thin to practically constitute the layer of light sensitive substance and which, at the same time, is as dense and homogeneous as possible.

Accordingly, a further object of my invention is to provide a photo-voltaic cell comprising an active layer of thin but dense homogeneous material.

Still a further object of my invention is to provide a photo-voltaic cell of thin active layers which are in intimate union with each other.

Another object of my invention is to provide a photo-voltaic cell in which there is an intimate molecular union between the layers of light sensitive substances and cover.

A further object of my invention is to provide novel methods of making a photoelectric cell.

Still a further object of my invention is to equalize resistance between different points of the boundary layers of the cell.

There are other objects of my invention which, together with the foregoing, will appear in the detailed description which is to follow in connection with the drawing in which.

In general, my cell consists of a plurality of superposed layers of substances, and more specifically comprises a layer of light sensitive substance such as selenium or another element of the sixth group such as tellurium or sulphur of the periodic system of elements applied to a metal or other suitable contacting base plate and superimposing thereon another conducting layer thin enough to permit light impinged thereon to affect the light sensitive material.

Figure 1:
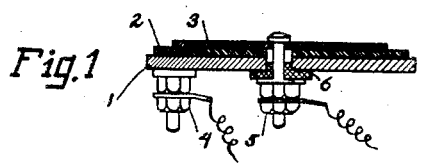
Figure 1 is a cross-sectional view of one embodiment of my invention.

Referring to the drawing, I have shown in Figure 1 a base plate 1, on which is securely mounted a light sensitive substance 2 of selenium or any other suitable element of the sixth group of the periodic system such as tellurium or sulphur, or of a compound containing selenium. On the substance 2 there is a metal covering 3.

The base plate 1 is fitted with a terminal screw 4 contacting the base 1, and a stud 5 which passes through a central opening in all of the layers of the cell. Stud 5 is insulated from the base and the layers by the insulating material 6 but is in conducting contact with the cover 3 and serves as the negative terminal of the cell.

The metal 3 in this case is made of a metal such as, for example, alkali metal, or a metal salt, or of graphite or the like, or of a metal alloy such as Wood's metal.

The light sensitive material 2 is made as thin as possible and at the same time as dense and as homogeneous as possible. The thickness of this active layer is of the order of a few hundredths to a few tenths of a millimeter so that it constitutes practically the mere surface of the layer of light sensitive substance and is united as intimately as possible with the base 1 and cover 3 on either side of it. The resistance is distributed both over the surface of the layers and also from layer to layer, and the materials chosen for both the substance 2 and the cover 3 are made with special regard to the electric contact potentials produced at their surfaces of contact.

It is of importance to secure intimate union between the covering 3 and the light sensitive layer 2; that is to say, that they unite at as many points as is possible at the surfaces between them. The degree of union or, in other words, the number of points which meet, determines the efficiency of the cell both as regards the variation of resistance and consequently of current flow for a given change in illumination and in the present as regards the electromotive force generated by the cell.

Intimate and wide contact between the layers may be obtained by making the covering 3 of leaf metal and uniting it with the light sensitive substance 2 by pressure or gumming it on with a thin layer of varnish. The covering 3 may be made of graphite or of soft metal such as lead, Wood's metal and the like, by rubbing the metal on the sensitive substance. For instance, such compositions as are used in lead pencil manufacture may be used in this way, particularly copying pencil compositions which, presumably because of the aniline colouring it contains, considerably increases the sensitiveness of the cell.

Another method is the spraying method described below. The covering may also be made by strewing fusible metal in leaf or powder form upon the sensitive layer and heating it to cause superficial fusion. Or it may be made in an electrolytic bath or by the so-called contact or rubbing processes which employ solutions of metal salts in a bath of mechanical or chemical detergents. Also a combination of mechanical and electrochemical methods may be used in making the covering. By whatever means the covering is made it is desirable to heat it for a short time to get rid of traces of moisture and air.

In order that the intimate union of sensitive substance and covering may be effective, it is desirable that there shall also be intimate union between the sensitive substance and the base plate. To secure this the surface of the base plate should be made chemically clean, for instance by heating it in the absence of air. The surface of the base plate may be roughened, for instance by a sand blast, and it may be perforated or pitted to afford the light sensitive substance a good hold over a wide surface. This result may also be attained by choosing for the base plate a metal such as tin, which alloys with selenium, at a temperature of about 150° C.

In cells which are to supply a useful current without an auxiliary source of current, care should be taken that the resistance of the covering 3, which is necessarily thin for translucence, is not too great. The covering material should therefore be of high conductivity compared with the light sensitive substance.

If selenium is used, the light sensitive layer is prepared in the known manner by long-continued heating of a commercial selenium at temperatures between 180°–220° C., which brings it to a suitable grade of crystallization. The requisite temperature and time of heating depend on the origin of the selenium and its impurities, and are ascertained by experiment. The thickness of the selenium layer or other light sensitive substance may be from a few hundredths to a few tenths of a millimeter. The selenium may be mixed with small amounts of metals, including alkali metals, metal salts, graphite, and other substances, for instance alloys of selenium with metals (potassium or sodium selenide) to obtain higher conductivity and thus produce a cell of low resistance which for some purposes is desirable.

To prevent oxidation of the covering when it is susceptible to corrosion which would soon diminish the output of the cell, it is enclosed in a gastight vessel which is evacuated if the covering consists of, for instance, mercury or potassium. Cells carrying a heavy current have their enclosing vessels filled with an inert gas, such as hydrogen, to carry off the heat. If the cell is not enclosed, heat dissipation may be secured by the provision of radiating fins or for smaller loads the selenium may have a lip protruding beyond, that is, not covered by the covering.

Such light sensitive substances as are at present available are lacking in uniformity. It is found that of a number of cells dealt with simultaneously and similarly, some show a small output. This inequality is due to air or gas-filled hollows occurring in the light sensitive substance during its forming (crystallizing) process. According to the invention, therefore, the substance to be formed is subjected to pressure in order that the product may be homogeneous and free from bubbles. It may be pressed cold or while gently heated after it has been put on the base plate and before or during the forming. It is of advantage to press momentarily and repeatedly, so that gases may readily escape in the intervals.

It is also desirable with a view to a homogeneous product to put the light sensitive substance on the base plate in a finely divided condition, for instance by dusting it on through a sieve. By this means too an even thickness of the thin layer is more certainly obtained than by the old method of rubbing a selenium rod upon the heated base plate. This is particularly of importance on large surfaces. The dusting method has also the advantage that under the action of pressure and heat the bulk of the air escapes through the interstices of the powder; the thinner the layer, the more readily the air escapes. If it be thin enough, the time of forming is reduced from many hours to a few minutes. Also the increased oxidation resulting from this process favourably affects the output of the cell. When the sensitive substance thus dusted on has been pressed cold or slightly warmed, the plate is brought to a temperature requisite for forming (with selenium about 200° C.) and the pressing may be repeated. By this process it is possible to reduce the dark resistance of the cell to about 1000 ohms or less, as measured by passing a weak direct current through the cell in the opposite direction to the current flowing when the cell is in use. The same effect is obtained by sulphatizing the surface.

Another method of getting a homogeneous layer of any desired thickness not involving pressing, is described below.

So far the best results have been obtained with cells having a layer of selenium covered with a layer of graphite, or better of copying pencil composition rubbed on a thin sheet of leaf gold or Wood's metal applied. If leaf gold is used without a graphite underlay the effect is less, while Wood's metal without a graphite underlay gives a better effect. This seems to warrant the conclusion that in the choice of the material for the covering, regard should be had to the order in the electromotive force series of the substances, in which gold and Wood's metal stand nearer to selenium than graphite. From this it is explicable why the intimate union of covering and sensitive substance is of such importance. It is plainly a matter of forming a boundary layer of molecular thickness which is subject to a strong electric field determined by the distance of the substances apart in the electromotive force series.

This boundary layer of molecular thickness is assisted by superficial oxidation or sulphation of the light sensitive substance, or by mixing with that substance materials which, on hardening, form a thin non-conducting skin on its surface. It seems to be of advantage if this skin (and the boundary layer generally) has a somewhat higher ohmic resistance than the layers on each side of it. When selenium is used, a good boundary layer may be obtained by, for instance, allowing the selenium to harden in the presence of oxygen or oxidizing gases. The superficial poorly conducting selenium oxide is recognizable by its dull gray and partly brownish colour. A good boundary layer of non-conducting substance is also obtainable by the addition to the light sensitive substance of such materials as kaolin or rare earths which, on heating and if required subjecting to reducing action, produce the boundary layer. As is explained below, these materials offer advantages in other respects.

It is of advantage to apply an auxiliary potential during the pressing of the covering or the forming or pressing of the sensitive layer. The heating which results when the current is large contributes to the forming process and in some circumstances other heating can be dispensed with.

When the finished cells are tested it sometimes happens that because the layer of sensitive substance is thin, metallic connection is found to have been established between covering and base plate. To save scrapping such cells they are momentarily subjected to a potential higher than that at which the cell is to operate, and the heavy current passed through destroys the conducting bridge and makes the cell operative.

Cells of very large outputs may be made by the processes above described. But it is better to use for large outputs a number of smaller cells of similar characteristic (behaviour under varying illumination), as ascertained by previous test, and to connect them to form a single unit. Another method of getting a uniform electrical characteristic over a large surface consists in dividing only the covering into separate areas for testing and connecting together those areas which are equally effective.

Consideration will next be given to equalizing the resistance within the layers of the cell. Observation shows that the sensitiveness to light resides particularly in the upper boundary of the sensitive substance immediately beneath the covering. The several points of this boundary surface or boundary layer can be shown by measurement to differ electrically, and this lack of uniformity may be regarded as the variation between molecular sources of electromotive force lying in parallel in the boundary layer, a variation either of electromotive force generated or of internal resistance.

Disadvantages which result from the connection in parallel of primary elements of different internal resistance or even different electromotive force are well known, and internal short-circuit may even wholly prevent the system yielding current. Since the electromotive forces of the molecular elements are very small, it is particularly important that these elements shall be uniform in electrical qualities. Such lack of uniformity as exists may be diminished and practically obviated by putting a layer of larger resistance in series with these molecular elements so that the differences in the elements are but a fraction of the total resistance.

Such equalization of resistance may, for example, be procured by adding poor conductors to the light sensitive substance. For instance, if selenium is used, small amounts, say 5 to 10%, of sulphur or clay or of the rare earths as cerium oxide or thorium oxide, are added. Generally speaking, any poor conductor mixable with selenium may be used which by nature or on account of its small amount does not alter the character of the sensitive layer in respect to the potential series.

Another method of equalizing resistance is, in the case of selenium, to carry out the forming, that is, the conversion of the non-conducting form of selenium into the crystalline conducting form, incompletely at a diminished temperature, or to break it off prematurely. The selenium does not then have the well known shiny metallic lustre but a velvet dull gray surface. This is particularly easily obtained if sulphur is added to the selenium. Probably the sulphur combines with the traces of metal, for example copper, which are usually present in commercial selenium.

Also, after forming, the layer may be momentarily heated to the temperature of fusion. A blackening then shows at the edges of the base plate where the selenium layer is visibly fused and therefore no longer crystalline, while the surface keeps its dull gray colour. The fused layer of selenium then forms the resistant layer.

A third method is to employ poorer conductors for the covering, or to mix graphite or a non-conductor such as kaolin, with the metal of the covering. If the powdered materials do not combine together an oil or gum such as tragacanth is added, which is later vaporized by brief heating.

Finally, a separate resistance layer, for instance, a thin layer of varnish, may be inserted most simply beneath the graphite or other covering. And the above mentioned layer of graphite beneath metal should act as such a resistance.

This method, the effectiveness of which rests on the insertion of resistance in series with all the molecular elements, merely increases the internal resistance of the cell, without lessening its sensitiveness to light. The method is practically applicable to cells used for purposes where internal resistance does not matter.

To obtain as thin and homogeneous a layer of light sensitive substances as possible, instead of the substance being applied to the base plate in molten condition or in powder form under pressure as above described, it may be deposited on the base plate from the vaporous or a vapor-like condition.

For instance, the light sensitive substance, say selenium, may be vaporized in a furnace and allowed to deposit on the base plate within the furnace. This gives a layer intimately united with the base plate and of great uniformity. The uniformity is improved by heating the base plate before putting it into the stove, but not to the temperature of the vapor. The base plate may be also previously covered with a ground layer of the substance. Simultaneously with the light sensitive substance or admixed with it, other substances affecting the sensitiveness to radiation or other properties of the cell, may be vaporized and deposited on the base plate, for instance, sulphur (a few percent), potassium, sodium, and other metals, aniline or aniline dyes. Or the light sensitive substance may first be deposited from vapor and the additional substance or substances subsequently applied as a thin deposit.

To the layer of sensitive material thus deposited, a covering is applied if desired by a similar process, in which case the melting point of the material which is to make the covering of molecular thickness must be lower than the melting point of the light sensitive layer. Volatile metals such as Wood's metal, lead or tin are suitable.

Another method is to atomize the light sensitive substance and spray it on the base plate, preferably under a pressure of 4–6 atmospheres as in the Schoop process of metal spraying. Direct contact with a form should be avoided, as that is generally too hot and will burn instead of melting the substance. The substance is therefore liquefied in a spraying pistol by indirect heating (for selenium 200 to 300° C. is required) and then atomized in a stream of air or gas. If, for instance, oxygen is used the desired mixture is thereby at once produced. Similarly by using gases containing sulphur, a sulphur selenium mixture may be produced, and so on. If such mixture is desired only on the surface, an indifferent gas may be used for atomizing and the finished layer subsequently treated at a suitable temperature with oxygen, and so forth. For this purpose atomizing may be done in a chamber filled with oxygen, and so on, or with indifferent gas.

Atomizing is facilitated if sulphur is mixed with the molten substance. The air for atomizing is preferably preheated. To secure an even deposit it is desirable to fix the atomizing apparatus and to move the base plate on which the deposit is to be made uniformly, or vice versa. This particularly applies to large surfaces.

The methods of the invention not only give a sensitive layer or boundary layer of great uniformity but also secure intimate union between this layer and those on each side of it. It favors intimate union if spraying is carried out under high pressure, say of 4–6 atmosphere. This also gives a certain fineness of grain to the sensitive layer and a specially dense deposit like that obtained from deposition from vapor.

The atomizing process may also be employed in applying the covering. For this purpose graphite should be brought to the colloidal form. Wood's metal is suitable on account of its low melting point, and so are other metals and metal alloys, and mixtures of Wood's or other metal powder and graphite. It is preferable to spray the covering without consideration of the desired thickness of the layer, and to thin it subsequently. This gives a very thin and uniform covering. The thinning may be done mechanically (by grinding or scraping) or by heating and wiping with a piece of felt or the like. The proper thickness is obtained by repeated heating and wiping, the sensitiveness of the cell being repeatedly tested.

Both the deposition and spraying methods can be applied to surfaces of any desired size without involving heavy apparatus.

Cells made according to the invention may be used for indicating not only light but also heat radiation, X-rays, and ultra-violet radiation.

When illuminated by an incandescent lamp they produce without an auxiliary source of current, a current of useful amount. In other cases the cell may be connected to the grid of an amplifying valve so that the current yielded by the valve amplified by further valves if desired, may be employed to operate instruments and apparatus requiring considerable energy.

To increase the efficiency of the system, the cell if a pulsating illumination is provided in accordance with well-known methods may be connected with the valve or instrument through a transformer of high ratio, say 1:20 to 1:100, adapted both to the cell and the consuming device. This is specially desirable when the cell is at a distance from the amplifier or consuming device. Any known form of coupling may be employed to connect the cell with a valve, for instance, capacitative, resistance, or resistance-capacity coupling.

A bias potential may be applied to the grid of the valve to bring both valve and cell to a suitable point in their characteristics. The potentials required depend principally on the kind of valve used, the grid bias being between 1 and 20 volts. To facilitate proper adjustment of the grid bias, a separate electromotive force is applied to the cell and a special grid bias employed. The negative pole of the source may be connected with the base plate of the cell, and its positive pole to the covering with any requisite resistance in series.

Figure 2:
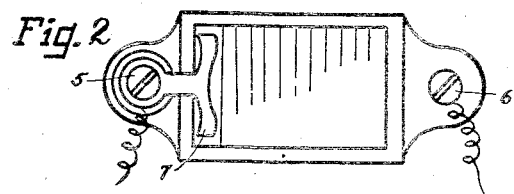
Figure 2 is a rectangular cell in plan view.

In Figure 2 a rectangular cell in plan is shown in which the terminals 5 and 6 are fitted to the cell for conducting the current thereto and therefrom, the terminal 5 conducting the current to and from the edge of the cover by a leaf spring 7 while current is led to and from the base plate through the terminal 6.

Figure 3:
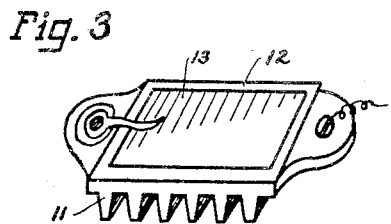
Figure 3 shows the same cell in perspective but with cooling fins.

In Figure 3 the same cell is shown in perspective except that the cell in this instance is provided with fins 11 and the light sensitive layer has a projecting lip 12 which is not covered by the thin metal covering 13.

Figure 4:
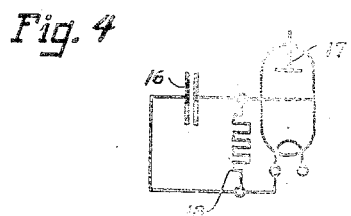
Figures 4 to 8 show various circuit diagrams in which my invention may be applied.

In Figure 4 my novel photoelectric cell is illustrated diagrammatically by the member 16 which is connected to the grid of an electrothermionic valve 17. Connected across the grid and filament of this valve 17 is a resistance 18 which serves to obviate too large a negative charge upon the grid in accordance with this type of valve.

Figure 5:
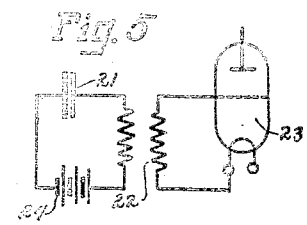

In Figure 5 the cell, according to my invention, is diagrammatically illustrated at 21 which is connected through a transformer 22 to the grid of the three electrode tube 23 and a source of current 24 is connected in series with the cell.

Figure 6:
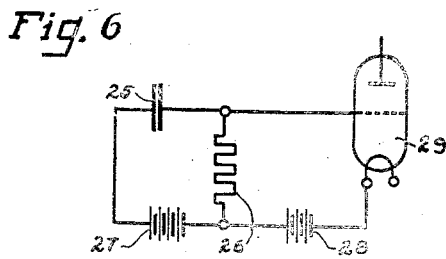

In Figure 6, the cell 25, according to my invention, is coupled to the three electrode tube by means of a pure resistance coupling 26. A source of energy 27 is shown for exciting the cell 25 and a source of energy 28 provides the necessary grid bias for the three electrode tube 29.

Figure 7:
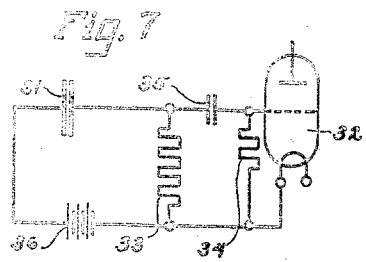

In Figure 7 resistance coupling between the valve 31, according to my invention, and the three electrode tube 32, is provided by means of a resistance-capacity coupling comprising the resistances 33 and 34 and the condenser 35. In this modification battery 36 is used merely to provide the excitation for the cell 31.

Figure 8:
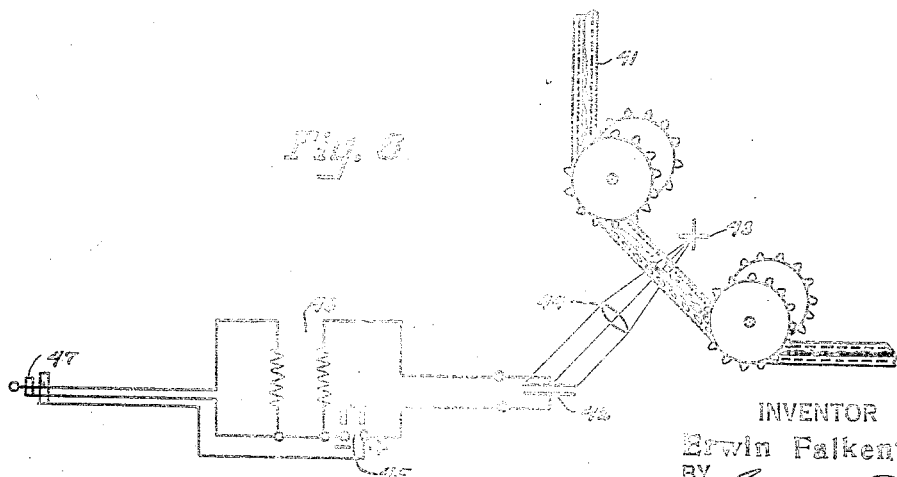

In Figure 8 I have shown diagrammatically apparatus in a system for reproducing from a sound film 41 by aid of a cell 42 constructed in accordance with my invention and which receives light from a source 43 through the film and a lens 44. Current output from the cell 42 is conducted either through a source of current 45 or directly to the transformer 46 and thence to the amplifying circuit of a loud speaker not shown, through the plug 47. This apparatus is particularly suitable for connecting the cell to the amplifier of a radio receiving set, the plug 47 being inserted in the socket provided for connection to a gramophone pick-up. In this case the third contact of the plug supplies the requisite potential to the cell obtained from a main transformer or the like.

As already mentioned, a cell operating without an auxiliary source of current can be used for many purposes and makes the apparatus very simple. The cell can thus be used for almost all measurements of light strength. One important application of this kind is to be found in the measurement of the thickness of translucent material such as paper during manufacture. The cell is directly connected with a commercial ammeter, and exposed through the web of material to the light of a constant source. It responds immediately to every variation of the light, that is, of the thickness of paper, and so enables the high speed machine to be almost instantly readjusted to give the proper thickness of paper.

What I claim is:

1. A method of manufacturing photo-voltaic cells comprising applying a thin light-sensitive layer comprised of a light-sensitive substance consisting essentially of selenium and a material of higher conductivity admixed thereto to a base conductor, transforming said layer into its crystalline form and producing a translucent and highly homogeneous conducting covering layer upon said light-sensitive layer closely and intimately adhering thereto by applying conducting material in a finely divided condition under such conditions and at such a temperature that the crystalline structure of the selenium is not substantially modified.

2. A method of manufacturing photo-voltaic devices comprising applying a thin layer of light-sensitive substance consisting essentially of selenium to a base conductor, transforming said layer into its crystalline form, producing a translucent conducting covering layer to said light-sensitive layer by applying conducting material in a finely divided condition to the surface of said light-sensitive layer, producing a further translucent covering layer upon said first covering layer by applying conducting material of different composition to said first covering, both said covering layers being applied under such conditions and at such a temperature that the crystalline structure of the selenium is not substantially modified.

3. A method of manufacturing photo-voltaic devices comprising applying a thin layer of light-sensitive substance consisting essentially of selenium to a base conductor, transforming said layer into its crystalline form, producing a first translucent and highly homogeneous conducting covering layer upon said light-sensitive layer closely and intimately adhering thereto by applying conducting material in finely divided condition to said light-sensitive layer, producing a further translucent and highly homogeneous covering layer upon said first covering layer by applying conducting material of higher electrical conductivity than said first covering layer, both said covering layers being applied under such conditions and at such a temperature that the crystalline structure of the selenium is not substantially modified.

4. A method of manufacturing photo-voltaic devices comprising applying a thin layer of light-sensitive substance consisting essentially of selenium to a base conductor closely and intimately adhering thereto, applying mechanical pressure to said layer, annealing said layer to transform it into its crystalline form and producing a translucent and highly homogeneous conducting covering layer upon said light-sensitive layer closely and intimately adhering thereto by applying conducting material in a finely divided condition under such conditions and at such a temperature that the crystalline structure of the selenium is not substantially modified.

5. A method of manufacturing photo-voltaic devices comprising applying a thin layer of selenium to a base conductor closely and intimately adhering thereto at all points of the surface, applying pressure to said layer, annealing said layer to transform it into crystalline selenium, and producing a translucent and highly homogeneous conducting covering layer upon said selenium layer closely and intimately adhering thereto by spraying on conducting material in finely divided condition to the surface of said selenium layer under such conditions and at such a temperature that the crystalline structure of the selenium is not substantially modified.

6. A photovoltaic cell comprising a conducting base plate, a layer of light-sensitive material consisting substantially of selenium in crystalline form upon said base plate, and a translucent homogeneous covering layer of conducting material in finely divided form upon and in intimate molecular contact with the crystalline surface of said light-sensitive layer.

7. A photovoltaic cell according to claim 6, wherein the covering layer is of a material having a considerable contact potential relatively to the light sensitive layer.

8. A photovoltaic cell according to claim 6, wherein the covering layer is of a mixture of alkali metal with other conducting materials.

9. A photovoltaic cell according to claim 6, wherein the light-sensitive layer consists of a mixture of selenium with rare earths.

10. A photovoltaic cell according to claim 6, wherein the light-sensitive layer consists of a mixture of selenium with radioactive substances.

11. A photovoltaic cell according to claim 6, wherein the light-sensitive layer consists of a mixture of selenium with materials of higher conductivity.

12. A photovoltaic cell according to claim 6, wherein the surface of the conducting base plate is roughened.

13. A photovoltaic cell comprising a conducting base plate, a layer of light-sensitive material consisting substantially of selenium in crystalline form upon said base plate, a translucent homogeneous covering layer of conducting material in finely divided form upon and in intimate molecular contact with the crystalline surface of said light sensitive layer, and a second translucent homogeneous covering layer of conducting material upon said first covering layer.

14. A photovoltaic cell according to claim 13, wherein the second covering layer consists of a material of higher electroconductivity than the first said covering layer.

15. A photovoltaic cell according to claim 13, wherein the first covering layer consists of a powder of graphite and the second covering layer of leaf metal.

16. The method of producing photovoltaic cells which consists in applying a thin layer of light-sensitive material consisting essentially of selenium upon a conducting base plate, annealing said material to transform the same into its crystalline form, and applying a translucent homogeneous covering layer of conducting material in finely divided form to the crystalline surface under such conditions and at such a temperature that the crystalline structure of the selenium is not substantially modified whereby said covering layer adheres closely and intimately to the surface.

17. The method according to claim 16, wherein finely divided conducting material is rubbed into the surface of the light-sensitive layer.

18. The method according to claim 16, wherein conducting material is vaporized and deposited upon the light-sensitive layer at a temperature below that at which the crystalline structure of the light sensitive layer will be substantially modified.

19. The method according to claim 16, wherein finely divided conducting material is sprayed upon the light-sensitive layer.

20. The method of producing photovoltaic cells, which consists in applying a thin layer of light-sensitive material consisting essentially of selenium upon a conducting base plate, superficially alloying said light sensitive substance with said base plate at the surface of contact therebetween, annealing said layer to transform the same into its crystalline form, and applying a translucent homogeneous covering layer of conducting material in finely divided form to the crystalline surface, under such conditions and at such a temperature that the crystalline structure of the selenium is not substantially modified, and applying a further translucent covering layer of conducting material upon said first covering layer.

21. The method of producing photovoltaic cells, which consists in applying a thin layer of light sensitive material consisting essentially of selenium upon a conducting base plate, subjecting said layer repeatedly to mechanical pressure, annealing said layer to transform the same into its crystalline form, and applying a translucent homogeneous covering layer of conducting material in finely divided form to the crystalline surface, under such conditions and at such a temperature that the crystalline structure of the selenium is not substantially modified, whereby said covering layer adheres closely and intimately to the surface.

ERWIN FALKENTHAL.